(No Model.) 2 Sheets—Sheet 1.

I. DAVIES.
MACHINE FOR CLEANING TIN OR TERNE PLATES.

No. 450,929. Patented Apr. 21, 1891.

Witnesses:
E. P. Ellis,
B. Brockett,

Inventor.
Isaac Davies,
per
Lehmann & Pattison,
attys

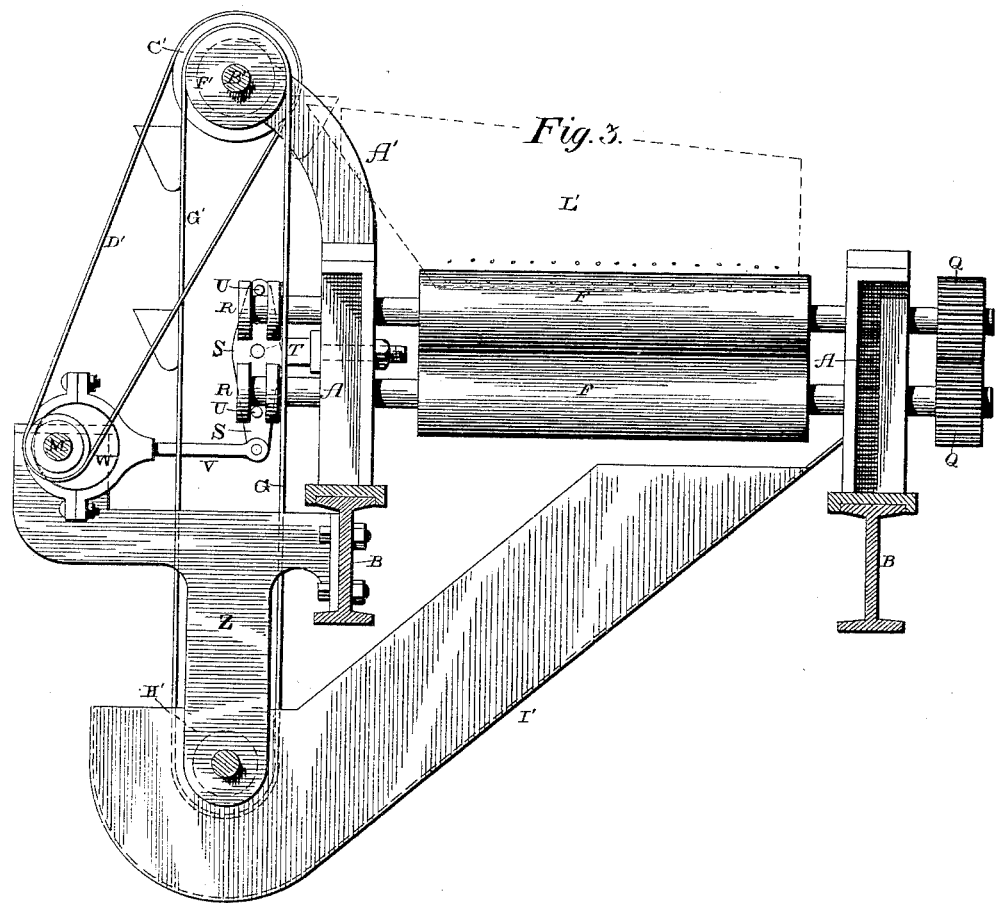

UNITED STATES PATENT OFFICE.

ISAAC DAVIES, OF PHŒNIXVILLE, ASSIGNOR OF ONE-HALF TO FREDRICK RICHARD PHILLIPS, OF PHILADELPHIA, PENNSYLVANIA.

MACHINE FOR CLEANING TIN OR TERNE PLATES.

SPECIFICATION forming part of Letters Patent No. 450,929, dated April 21, 1891.

Application filed December 6, 1890. Serial No. 373,785. (No model.)

*To all whom it may concern:*

Be it known that I, ISAAC DAVIES, of Phœnixville, in the county of Chester and State of Pennsylvania, have invented certain new and useful Improvements in Machines for Cleaning Tin or Terne Plates; and I do hereby declare the following to be a full, clear, and exact description of the invention, such as will enable others skilled in the art to which it pertains to make and use it, reference being had to the accompanying drawings, which form part of this specification.

My invention relates to an improvement in machines for cleaning tin or terne plates; and it consists in certain novel features, which will be fully described hereinafter.

The object is to produce an improved machine which will take the tin or terne plates and thoroughly cleanse them.

Figure 1:
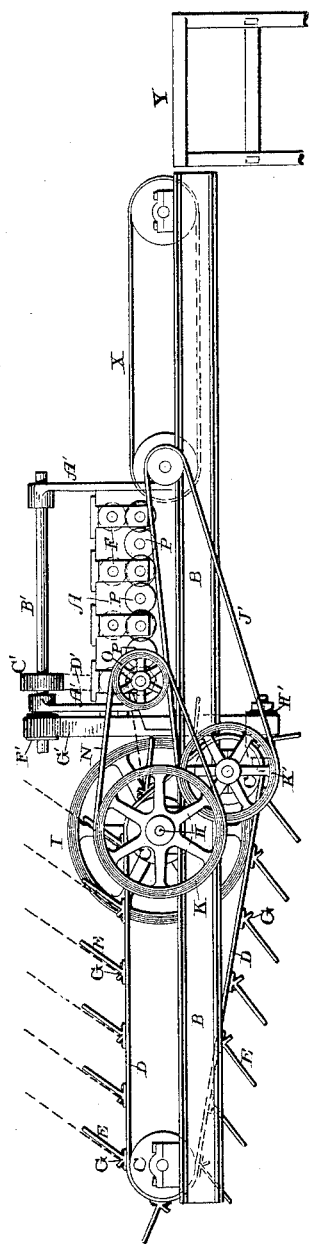
Figure 2:
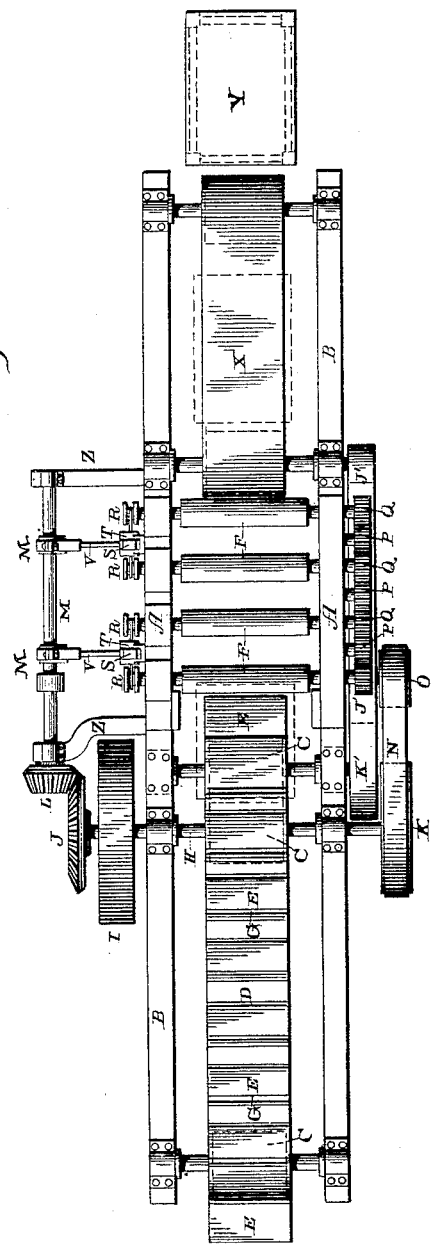

Figure 1 is a side elevation of a machine which embodies my invention. Fig. 2 is a plan view. Fig. 3 is an end view.

A represents a suitable frame-work, which is placed upon ground-sills B. Journaled in suitable bearings upon this frame-work A are the three pulleys C, which are arranged in the relation to each other as shown, and around which passes the endless band or belt D, of any suitable material, and to which are secured the supports E in any suitable manner. These supports E are made of flat plates placed at a suitable angle, and which serve as supports for the tin or terne plates while being conveyed to the cleansing-rollers F. The tin or terne plates are held in position by having their lower ends catch against recesses G, formed in the bases of the supporting-plates E. When the plates reach the point where the belt begins to descend from the inner to the lower roller, the tin or terne plates are just long enough to reach to the adjacent end rollers F, as shown by dotted lines in Fig. 1, and as the belt continues in its revolution it moves forward, owing to the incline formed in passing around the lower pulley C, and thus pushes the plate forward until its outer end is caught between the said rollers F, when it is carried by them to the other rollers.

The operating-shaft H, provided with the driving-wheel I, passes through one of the rollers C, and this shaft H has a beveled wheel J secured to one end and a pulley K secured to the other. The wheel J meshes with the pinion L upon the shaft M, while from the pulley K extends the belt N, which operates the pulley O, placed upon the shaft of one of the rollers F. The rotary motion is conveyed from the first roller to the others of the series by the idle-wheels P, so as to have them all revolve in the same direction.

Upon one end of each roller-shaft is placed a wide gear-wheel Q, so that the rollers will not get out of gear as they are reciprocated, and upon opposite ends of the shafts are formed the grooved heads R. In between each set of four rollers is pivoted a vertical lever S in the bearings T, and through each lever S are formed the openings U upon each side of the center, through which the pivotal bolt passes. Through the openings U in the lever S are passed rods which catch in the grooved heads R of two of the upper rollers and through the two of the lower corresponding rollers, so that when the levers S are caused to rock upon their bearings, the upper rollers F are moved endwise in one direction at the same time that the lower rollers are reciprocated in an opposite one. This reciprocating motion is given to the rollers F at the same time that they are revolving, so as to thoroughly rub or scour the plates which are passing through between them. To the lower end of each lever S is loosely connected an eccentric-rod V, which is operated by an eccentric W, placed upon the shaft M. As the plates issue from between the last pair of rollers they are deposited upon the endless belt X, which conveys them to the table Y in the sorting-room. The belt X is operated by the belt J', which passes around one of its pulleys, and which belt J' is operated by a pulley K' upon one end of the lower roller C. The shaft M is journaled in suitable bearings Z, which extend horizontally from the frame B.

From one side of the frame A rise two standards A', in which is journaled a shaft B', upon which is placed a pulley C', around which extends the driving-belt D' from the shaft M. Also, secured to the shaft B' is a pulley F', around which passes the belt G', down around the pulley H', journaled near the bottom of the chute I', in which the bran, sawdust, or other cleaning material is placed. To the endless belt G' are secured buckets, which carry up the bran or other cleaning material and drop it upon the tin plates as they are passing through between the two sets of rollers F: The movement of the plates carries the cleaning material in between the rollers, and as the rollers reciprocate the plates are thoroughly cleansed. As the cleaning material falls from the rolls it drops upon the chute I' and rolls down to where it will be readily gathered up by the buckets upon the belt G'.

Having thus described my invention, I claim—

1. In a machine of the character described, a series of upper and lower rollers, means for revolving and reciprocating them, a delivery-belt at the receiving end of the rollers, and a receiving-belt at the delivery end of the rollers, the parts combined substantially as shown.

2. In a machine of the character described, an upper and a lower set of rollers, means for revolving them, a lever for reciprocating them, a shaft having a cam or eccentric, and a connection between the cam and the said lever, the parts combined to operate substantially as described.

3. The combination of an endless belt for conveying the plates, sets of rollers which both revolve and reciprocate endwise, mechanism for reciprocating the rollers, and a mechanism for carrying up the cleaning material and dropping it upon the plates, substantially as set forth.

4. In a machine of the character described, cleaning-rollers and a belt having holders for receiving and delivering the plates to the rollers, the parts combined substantially as specified.

5. In a machine of the character described, cleaning-rollers and a traveling belt having holders for the plates, the inner end of the said belt declined toward the rollers, the parts combined substantially as and for the purpose described.

In testimony whereof I affix my signature in presence of two witnesses.

ISAAC DAVIES.

Witnesses:
E. D. FARIES,
WILLIAM VERNON PHILLIPS.